Aug. 29, 1950     S. DUMA     2,520,759
SETTING AND RELEASING EMERGENCY
FOOT-BRAKE MECHANISM

Original Filed Oct. 11, 1946     2 Sheets—Sheet 1

INVENTOR.
STEPHEN DUMA
BY
ATTORNEY

Aug. 29, 1950 S. DUMA 2,520,759
SETTING AND RELEASING EMERGENCY
FOOT-BRAKE MECHANISM
Original Filed Oct. 11, 1946 2 Sheets-Sheet 2
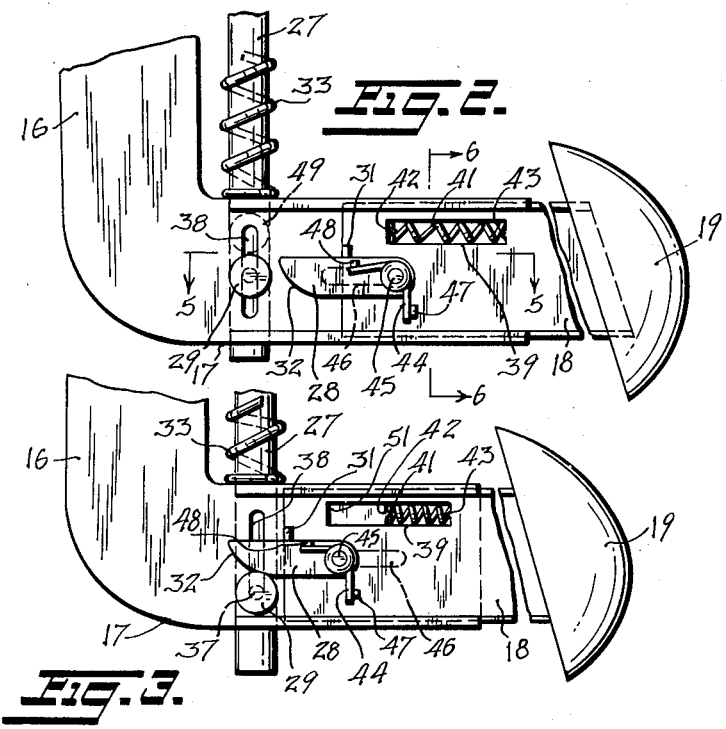
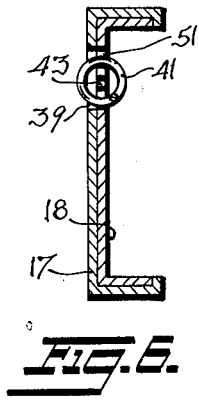
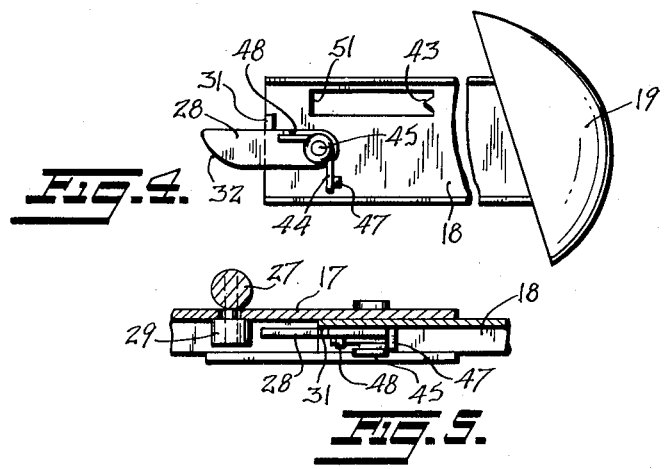
INVENTOR.
STEPHEN DUMA
BY
*Zoltan H. Polacsek*
ATTORNEY Patented Aug. 29, 1950

2,520,759

UNITED STATES PATENT OFFICE 2,520,759

SETTING AND RELEASING EMERGENCY FOOT BRAKE MECHANISM

Stephen Duma, Temecula, Calif.

Substituted for abandoned application Serial No. 702,700, October 11, 1946. This application December 6, 1949, Serial No. 131,469

2 Claims. (Cl. 74—539)

This invention relates to brake mechanisms for vehicles and more particularly to a foot setting and release device for emergency brake mechanisms. This is a substitute for my abandoned application, filed on October 11, 1946, Serial Number 702,700.

It is an object of the present invention to provide a setting and release device for a foot brake in which the latch adapted to engage serrations of an involute shaped rack is so arranged as to be retained in a compact manner upon the operating lever and the foot pedal device operating the latch is carried on the end of the operating lever and adapted to have a straight line motion running substantially normal to the extent of the operating lever.

It is another object of the invention to provide a brake mechanism with an automatic setting and releasing device which is simple to construct and can be made from standard stock material which at one end is channeled, turned and adapted to receive a smaller channel containing the foot pedal.

According to the invention, a lever is channeled and bent at its lower end to receive a channel bearing a foot pedal. The lever is fulcrumed to the vehicle at a point along its length and is adapted to have at its end opposite to the foot pedal a link connecting the lever with the brakes. Below the fulcrum there is mounted upon the vehicle an involute curved rack having rack teeth extending along its lower edge. A latch is slidable on the lever in a direction toward the rack teeth and will engage the same at any position of the lever.

When the lever is in a position where the brakes are released the latch is rendered inoperative by the slidable foot pedal upon the lever. But as the foot lever is brought down over the rack the latch is brought into a position whereby it can be operated by the foot pedal device. A cam associated with the foot pedal device is operable upon the latch when the brake lever needs to be unlatched from the rack to return it to its releasing position by reason of the displacement of the latch due to the involute shaped rack. If the lever is at any other position except the released position, the cam on the foot pedal device is rendered effective upon the latch. A spring on the latch extending to the turned portion of the lever maintains the latch in engagement with the rack teeth.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 2 is an enlarged elevational view of the lower end of the brake operating lever when the lever is in its adjusted position.

Fig. 3 is a similar elevational view to that shown in Fig. 2 but where the pedal slide has been depressed to bring the lever to the brake released position and the cam moved to a position which lowers the latch to a position which disengages it from the rack teeth for its travel to the brake released position.

Fig. 4 is a side elevational view of the foot pedal slide with the latch operating cam thereon, the slide and cam being removed from the brake operating lever.

Fig. 5 is a longitudinal cross-sectional view as viewed along the line 5—5 of Fig. 2, looking in the direction of the arrows thereof.

Fig. 6 is a cross-sectional view, in elevation, taken transversely of the pedal slide and the bent rearward portion of the operating lever in which the pedal slide is operable, the view being taken along the line 6—6, looking in the direction of the arrows thereof.

Figure 1:
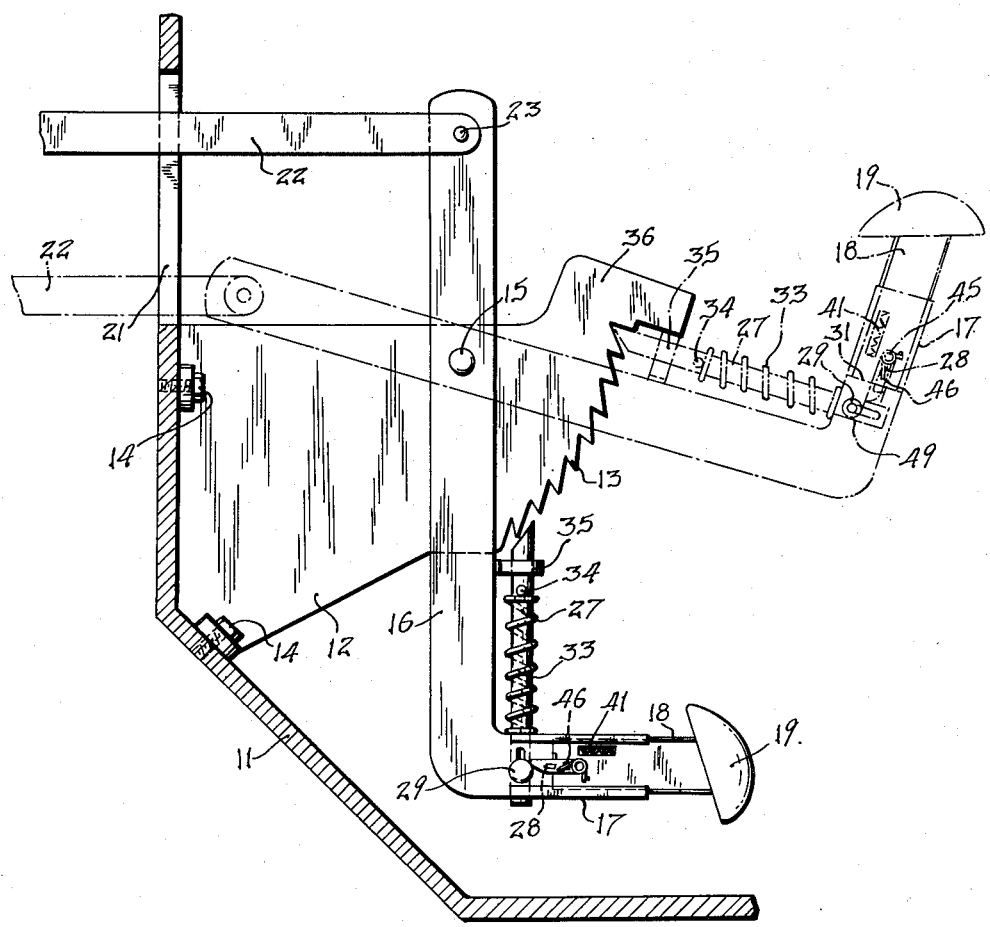
Fig. 1 is an elevational view of the brake operating lever connected for operation to the dashboard of a vehicle and showing the operating mechanism in both its released and adjusted positions.

Referring now to the figures, 11 represents a dashboard of a vehicle on which there is secured a rearwardly extending bracket 12 having an involute shaped rack portion 13 on its rearward edge. The connection of the bracket 12 with the dashboard 11 is made by bolts 14 or by other known convenient means such as rivets, welding, etc. Fulcrumed at 15 on the bracket is a brake operating lever 16 bent at right angles at its lower end where it is channeled and turned to provide a guide portion 17 for a latch operating pedal slide 18 having a pedal formation 19 thereon.

The upper part of the dashboard 11 has an opening 21 through which extends a link 22 pivotally connected at 23 to the upper end of the brake lever 16. The link 22 is connected to the brake mechanism in any well-known manner, not shown, and tension on this link from the braking system provides the necessary stress upon the brake lever 16 which enables the brake lever 16 to be returned to the released position, as shown in broken lines in Fig. 1.

To set the emergency brakes, the operator will place his foot on the pedal 19 when in the broken line position and will move the operating lever 16 downwardly about the fulcrum point 15 and effect the operation of the brake mechanism. In effecting this movement a latch 27 will ride over the rack teeth 13 and in whatever position foot pressure is relieved from the operating arm 16 the latch will cling to the rack and the operating arm will be held in its advanced or adjusted position.

In order that the brake lever 16 can be returned to its releasing position, the latch 27 must first be disengaged from the rack teeth. To effect disengagement the slide 18 is moved inwardly whereby to cause a pivoted cam element 28 to be thrust over a lateral projection or roller 29 secured to the lower end of the latch 27. During this operation the pivoted cam 28 is prevented from pivoting in a clockwise direction by a stop projection 31 of the forward edge of slide 18. A cam surface 32 will depress the roller 29 downwardly taking with it the latch 27. This movement is effected against the action of a latch spring 33 bearing against the top edge of the rearwardly extended portion 17 of the lever and acting upon the latch 27 through a cross pin 34. The upper end of the latch is guided by a lug or bracket 35 secured to the arm 16. This bracket 35 may serve as an abutment which engages a stop portion 36 at the upper end of the rack 13 for limiting the upward movement of the operating lever 16.

The roller 29 on the lower end of the latch 27 is provided on a pin 37 which acts in a slot 38 extending parallel to lever 16 in the portion 17. This pin and slot arrangement will further steady the lower end of the latch 27 against lateral displacement. With the latch finally released and with the foot still on the pedal but with light pressure the operating lever 16 will be returned by the tension of the braking system to the brake released position in which the bracket 35 abuts the stop portion 36 at the upper end of the rack 13.

In both the portion 17 and slide 18, there are slots 39 and 51 respectively (Fig. 6) adapted to contain a pedal slide return spring 41 fitted at its ends to projections 42 and 43 provided in the ends of the slots. The spring 41 is compressed as the pedal slide is operated (Fig. 3) and as pressure is released from the pedal the pedal slide is returned to its retracted position (Fig. 2).

As the operating lever is brought to its adjusted position it is desired that the cam 28 be disposed so as not to interfere with the riding movement of the latch over the rack teeth. The cam lever 28 is normally held up by a spring 44 surrounding a pin 45 which rides in a slot 46 in the portion 17. The spring is anchored to the slide 18 by a stop projection 47 and to the cam lever 28 by a stop projection 48 thereon. This spring 44 will normally hold the cam lever 28 up against the stop 31 on the slide 18.

The rack 13 is involute shaped so that the roller 29 assumes a dotted line position 49, as shown in Fig. 2, when the operating lever is released and raised to its position against the rack stop 36. Accordingly, when the slide 18 is depressed inwardly and lever 16 is brought to the adjusted position, the cam lever 28 will pass under the roller 29 so that the roller 29 will pivot the cam lever counterclockwise against the action of the spring 44 so that the cam lever is ineffective at this time to hold the latch down. When the lever 16 is in the adjusted position, the slide must again be operated for the cam lever 28 to have its cam surface 32 ride over the top of the roller 29 and thereby disengage the latch from the rack as lever 16 is returned to the brake released position. This occurs only when the operating lever has been adjusted to a brake retaining position and pedal slide 18 is depressed, as shown in Fig. 3.

It should now be apparent that there has been provided a simple setting and releasing emergency foot brake mechanism for vehicles.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A brake operating lever comprising an arm having a portion adapted to be fulcrumed upon a vehicle, a rack, a spring pressed latch adapted to cooperate with the rack to retain the lever in its adjusted position, a foot pedal device connected to the lever for relative movement with respect thereto and through which movement to the lever is imparted when movement of the foot pedal device has been consumed, means on the foot pedal device adapted to cooperate with the latch to release the same when the brake lever is in its adjusted position, said rack being involute shaped so that at the released position of the operating lever the latch is free of the foot pedal device, and when the foot pedal device is moved to its usual latch retracting position to adjust the brake operating lever the latch is free to assume a position in engagement with the rack, said operating lever having a bent portion at its lower end, said foot pedal device comprising a slide adjustable longitudinally along the bent portion, said latch slidable on the bent portion transversely to the movement of the pedal slide device, said means being on said slide device and comprising a pivoted cam lever, said latch having means adapted to receive the cam lever whereby the latch will be retracted if the means is in the path of the cam lever.

2. A brake operating lever comprising an arm having a portion adapted to be fulcrumed upon a vehicle, a rack, a spring pressed latch adapted to cooperate with the rack to retain the lever in its adjusted position, a foot pedal device connected to the lever for relative movement with respect thereto and through which movement to the lever is imparted when movement of the foot pedal device has been consumed, means on the foot pedal device adapted to cooperate with the latch to release the same when the brake lever is in its adjusted position, said rack being involute shaped so that at the released position of the operating lever the latch is free of the foot pedal device, and when the foot pedal device is moved to its usual latch retracting position to adjust the brake operating lever the latch is free to assume a position in engagement with the rack, said operating lever having a bent portion at its lower end, said foot pedal device comprising a slide adjustable longitudinally along the bent portion, said latch slidable on the bent portion transversely to the movement of the pedal slide device, said means being on said slide device and comprising a pivoted cam lever, said latch having means adapted to receive the cam lever whereby the latch will be retracted if the means is in the path of the cam lever, as when the brake lever is adjusted, the means on the latch being adjusted when the latch is in the upper end of the rack, as when the brake lever is released, to be positioned above the cam lever so that the cam lever will not work upon the means as the slide pedal is operated, said cam lever adapted to be moved down by the means on the latch and rendered ineffective as the latch rides down over the rack as when the operating lever is moved to a braking position.

STEPHEN DUMA.

REFERENCES CITED

The following references are of record in the file of this patent:

UNITED STATES PATENTS

| Number | Name | Date |
| --- | --- | --- |
| 489,456 | Butler | Jan. 10, 1893 |
| 904,148 | Potter | Nov. 17, 1908 |
| 1,037,257 | Hutchinson | Sept. 3, 1912 |
| 1,321,615 | Friddle | Nov. 11, 1919 |
| 1,330,298 | Baird | Feb. 10, 1920 |

FOREIGN PATENTS

| Number | Country | Date |
| --- | --- | --- |
| 252,114 | Great Britain | Oct. 5, 1925 |